(12) United States Patent
Yamamura et al.

(10) Patent No.: US 6,253,144 B1
(45) Date of Patent: Jun. 26, 2001

(54) VEHICLE LONGITUDINAL FORCE CONTROL

(75) Inventors: Yoshinori Yamamura, Yokohama; Ikuhiro Taniguchi; Kouichi Akabori, both of Kanagawa, all of (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 09/327,421

(22) Filed: Jun. 8, 1999

(30) Foreign Application Priority Data

Jun. 25, 1998 (JP) .................................................. 10-179207

(51) Int. Cl.$^7$ ................................ B60T 7/12; G06F 7/00
(52) U.S. Cl. ............................ 701/96; 701/93; 477/185; 303/193; 180/169
(58) Field of Search .................................. 701/96, 93, 70, 701/300, 301, 65, 66; 180/169, 170, 167, 168, 179, 197; 340/903, 435, 436; 303/193, 112, 183; 477/903, 97, 901, 902, 92, 194, 198, 185, 203, 204

(56) References Cited

U.S. PATENT DOCUMENTS

| 4,515,259 | * | 5/1985 | Ha ........................................... 477/198 |
| 4,676,354 | * | 6/1987 | Janiazewki et al. .................... 477/92 |
| 4,848,851 | * | 7/1989 | Kuraoka et al. ....................... 303/124 |
| 5,332,056 | * | 7/1994 | Niibe et al. ............................ 180/169 |
| 5,411,452 | * | 5/1995 | Katayama .............................. 477/206 |
| 5,731,977 | * | 3/1998 | Taniguchi et al. ..................... 701/96 |
| 5,913,576 | * | 6/1999 | Naito et al. ............................ 303/112 |
| 5,984,435 | * | 11/1999 | Tsukamoto et al. ................... 303/91 |
| 6,006,144 | * | 12/1999 | Takahashi et al. .................... 701/1 |
| 6,058,347 | * | 5/2000 | Yamamura et al. ................... 701/96 |

FOREIGN PATENT DOCUMENTS 5-246270   9/1993   (JP) .

* cited by examiner

*Primary Examiner*—Jacques H. Louis-Jacques
(74) *Attorney, Agent, or Firm*—McDermott, Will & Emery

(57) ABSTRACT

A longitudinal driving/braking force control system for controlling the vehicle speed and/or the headway vehicle-to-vehicle distance is arranged to bring a vehicle to a stop and to hold the vehicle in a stop condition with a stop holding braking force in a predetermined situation. When an accelerator pedal is depressed by a driver in the stop condition, a controller decreases the braking force from the stop holding braking force to zero according to a predetermined brake releasing characteristic to allow a start of the vehicle. In response to a driver's accelerator operation, the controller calculates a driver's input driving force, estimates a grade resistance of the vehicle and further calculates a brake actuation quantity corresponding to the grade resistance. Then, the controller modifies the brake releasing characteristic to ensure a smooth start in accordance with the calculated driver's input driving force, the estimated grade resistance and the calculated brake actuation quantity.

17 Claims, 14 Drawing Sheets

VEHICLE LONGITUDINAL FORCE CONTROL

BACKGROUND OF THE INVENTION

The present invention relates to a vehicle control apparatus or method for automatically controlling a headway vehicle-to-vehicle distance or a vehicle speed, and more specifically to a vehicle control apparatus or method for controlling a longitudinal driving or braking force in the case of driver's intervention.

Japanese Patent Kokai Publication No. 5(1993)-246270 discloses a vehicle control system for controlling the vehicle speed and the headway vehicle-to-vehicle distance. In such a system, the automatic control is interrupted by a driver's accelerator or brake pedal operation, and control is transferred to the driver.

SUMMARY OF THE INVENTION

It is an object of the present invention to provide control apparatus and method capable of controlling a vehicle longitudinal force smoothly when an automatic control is interrupted by driver's intervention. In particular, a concrete object is to enable a smooth start in response to a driver's accelerator operation from an automatic stop condition.

In the conventional control system of the above-mentioned Japanese Publication, the brake is released in accordance with the speed of the accelerator pedal operation. However, it is not easy for an average driver to start a vehicle smoothly from an automatic stop condition.

According to one aspect of the present invention, a vehicle longitudinal force control apparatus comprises:

a stop detecting section which detects a stop of a vehicle;

a brake actuator which produces a first brake actuating quantity when a stop is detected by the stop detecting section;

an accelerator pedal operation detecting section which detects an accelerator pedal operation of the vehicle;

an accelerator input driving force calculating section which calculates an accelerator input driving force caused by an accelerator pedal operation;

a grade resistance estimating section which estimates a grade resistance acting on the vehicle;

a second brake actuating quantity calculating section which calculates a second brake actuating quantity corresponding to an estimated grade resistance determined by the grade resistance estimating section; and a brake actuating force adjusting section which adjusts the first brake actuating quantity of the brake actuator in accordance with the estimated grade resistance, the accelerator input driving force and the second brake actuating quantity when the stop detecting section indicates a stop condition of the vehicle and the accelerator pedal operation detecting section indicates existence of an accelerator pedal operation.

According to another aspect of the invention, an automotive vehicle comprises;

an actuator section varying an actual longitudinal force of the vehicle, the actuator section comprising a brake system which produces an actual braking force of the vehicle, and a power system which produces an actual driving force of the vehicle;

a sensor section which collects input information on a vehicle operating condition of the vehicle; and a control section which is connected with the actuator section and the sensor section, to control motion of the vehicle, stop the vehicle and hold the vehicle in a stop condition by controlling the actual braking force and driving force with the brake system and power system in accordance with the input information, which allows a start of the vehicle from the stop condition in response to a driver's accelerator input by performing an automatic brake releasing operation to decrease the actual braking force from a stop holding braking force value for holding the vehicle in the stop condition to a minimum braking force value, and which estimates a grade resistance of the vehicle and modifies the automatic brake releasing operation in accordance with the grade resistance.

According to still another aspect of the invention, a vehicle longitudinal force control apparatus or method comprises:

stop detecting element for producing a stop condition signal indicating that a vehicle is in a stop condition;

override detecting element for producing an accelerator override condition signal indicating a driver's accelerator override;

input driving force calculating element for calculating a driver's input driving force parameter representing a driver's input driving force produced by a driver's accelerator operation;

grade resistance estimating element for estimating a grade resistance of the vehicle and determining a grade resisting parameter corresponding to the grade resistance; and brake releasing element for decreasing a braking force of the vehicle from a stop holding braking force value according to a brake release control characteristic in response to the accelerator override signal when the stop condition signal is present, and for adjusting the brake release control characteristic in accordance with the driver's input driving force parameter and the grade resisting parameter.

DETAILED DESCRIPTION OF THE INVENTION

Figure 1:
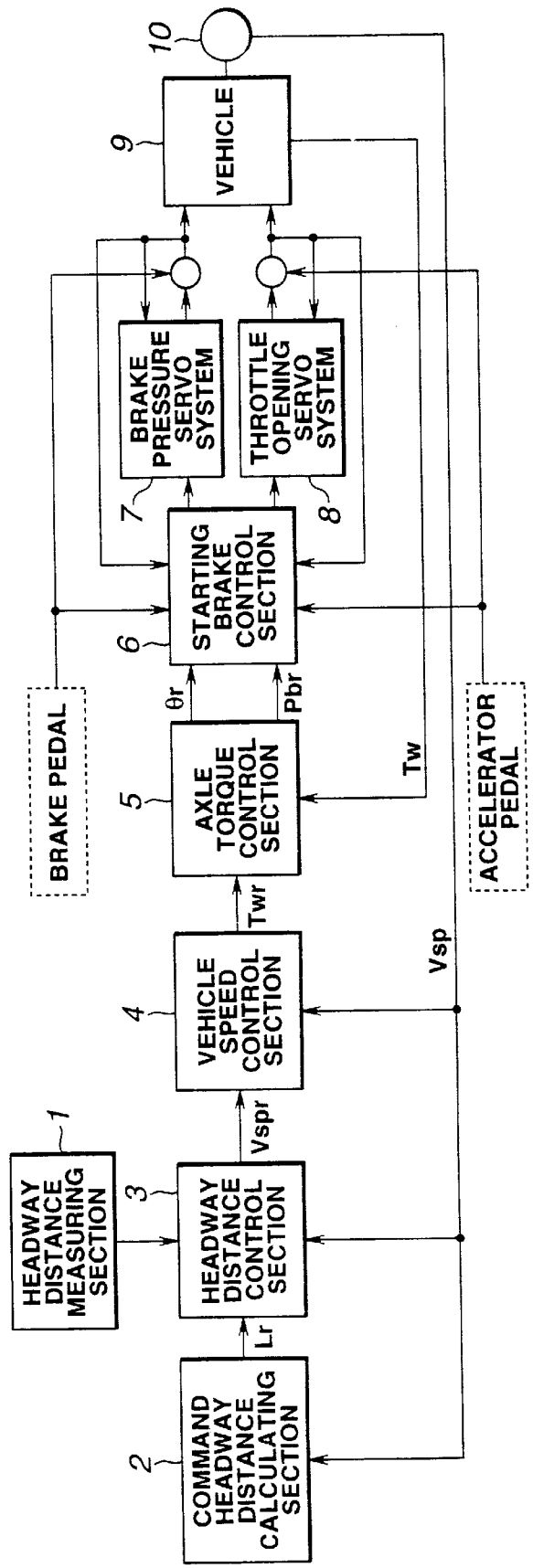
FIG. 1 is a block diagram showing a vehicle control system according to one embodiment of the present invention.

FIG. 1 shows a vehicle longitudinal (braking/driving) force control system according to one embodiment of the present invention. This control system is for controlling the braking and driving forces of a controlled vehicle in which this system is installed. This control system comprises the following sections.

A headway distance measuring section 1 measures an actual vehicle-to-vehicle headway distance Lv of a forward vehicle from the controlled vehicle.

A headway distance command section (or command headway distance calculating section) 2 calculates a desired (command) vehicle-to-vehicle headway distance Lr in accordance with a vehicle speed Vsp of the controlled vehicle.

A headway distance control section 3 calculates a command vehicle speed Vspr to make the measured headway vehicle-to-vehicle distance (actual distance) Lv equal to the desired command distance Lr.

A vehicle speed control section 4 calculates a command drive axle torque Twr to make the actual vehicle speed (or measured vehicle speed) Vsp of the controlled vehicle equal to the command vehicle speed Vspr.

A drive axle torque control section 5 calculates a command throttle opening θr and a command brake pressure Pbr to control an actual axle torque (measured axle torque) Tw equal to the command axle torque Twr.

A starting brake control section 6 is characteristic of the present invention, as mentioned later.

A brake (fluid pressure) servo system 7 controls the actual brake fluid pressure of a brake actuator system of the controlled vehicle, in accordance with the command brake pressure of the starting brake control section 6.

A throttle (opening) servo system 8 controls the actual throttle opening for the engine of the controlled vehicle, in accordance with the command throttle opening of the starting brake control section 6.

This system is mounted on the controlled vehicle 9 and arranged to control the braking and driving forces of the controlled vehicle 9. There is further provided a vehicle speed sensor 10.

Figure 2:
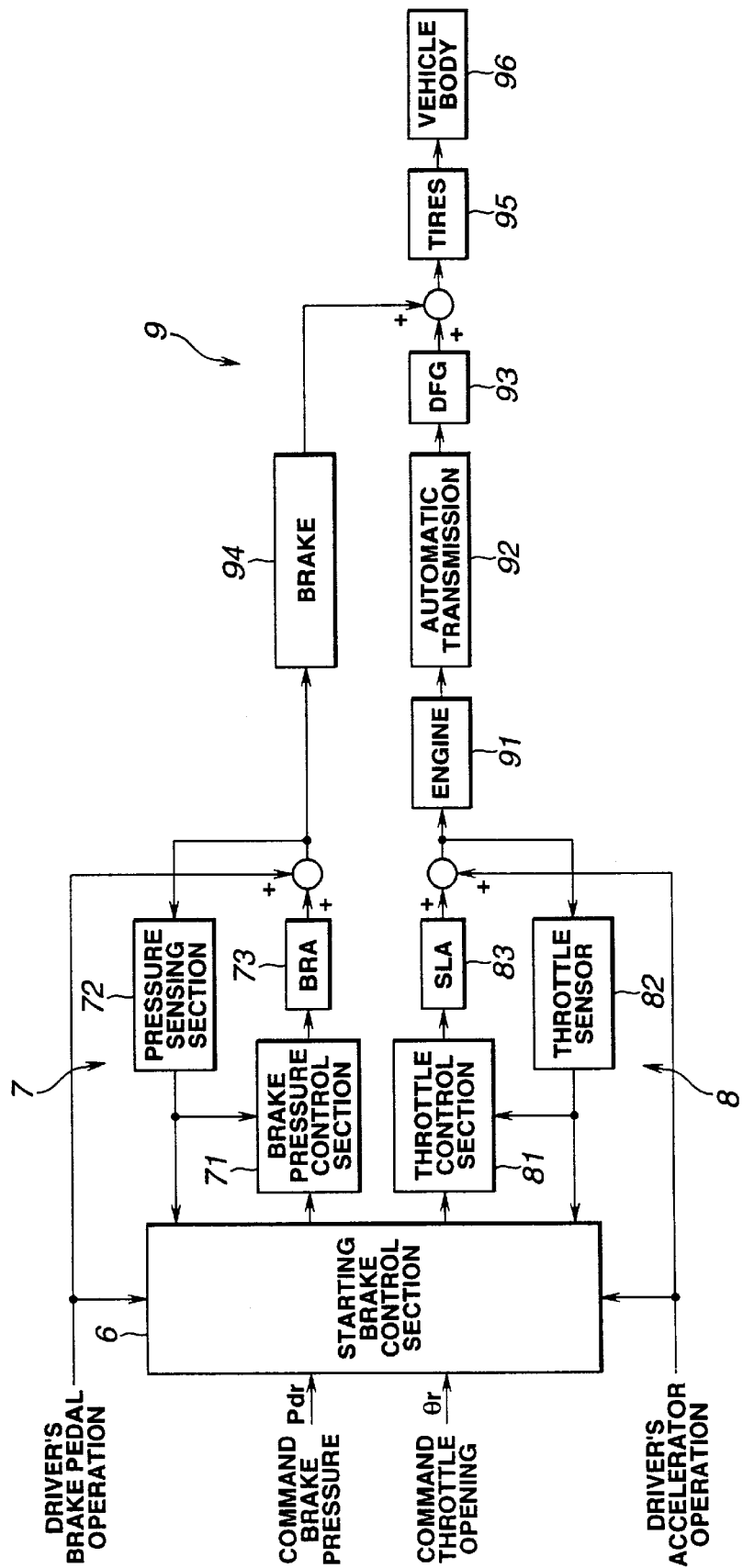
FIG. 2 is a block diagram showing a brake servo system, a throttle servo system and a vehicle shown in FIG. 1.

FIG. 2 shows the structures of the brake servo system 7, the throttle servo system 8 and the vehicle 9.

The brake servo system 7 comprises a fluid pressure control section 71, a fluid pressure sensing section 72 and a brake actuator (or actuator system) (BRA) 73.

The throttle servo system 8 comprises a throttle opening position control (throttle opening calculating) section 81, a throttle opening (or position) sensor 82, and a throttle actuator (SLA) 83.

The controlled vehicle 9 comprises the engine 91, an automatic transmission 92, a differential gear (DFG) 93, a brake system 94, tires 95 and a vehicle body 96.

Figure 3:
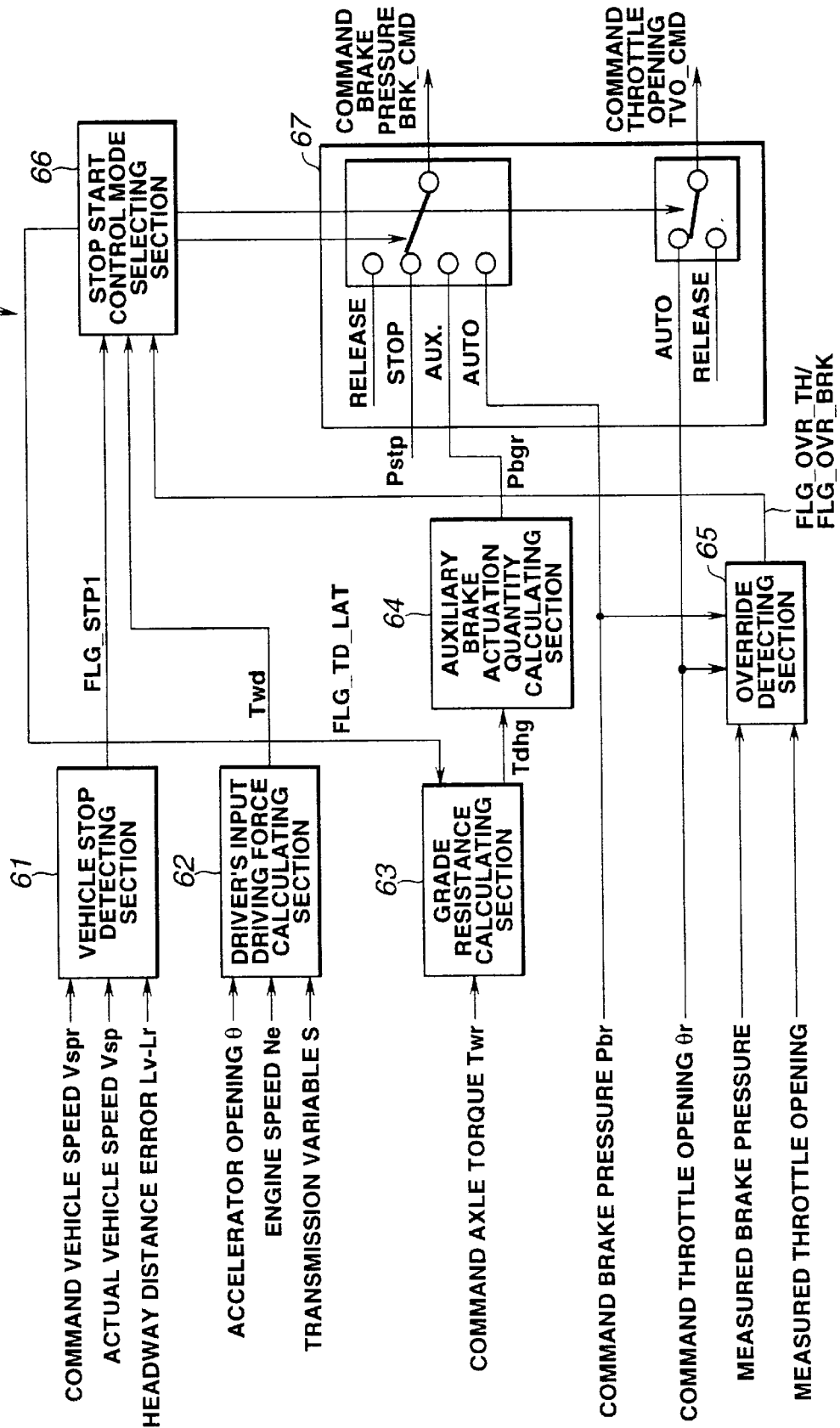
FIG. 3 is a block diagram showing a starting brake control section shown in FIG. 1.

As shown in FIG. 3, the starting brake control section 6 comprises the following sections (or subsections).

A vehicle stop detecting section 61 monitors the command vehicle speed Vspr, the actual vehicle speed Vsp and a vehicle-to-vehicle headway distance error (or deviation) (Lv−Lr), and determines whether a stopping operation by an automatic inching control is completed, in accordance with these inputs.

A driver's input driving force calculating section 62 calculates a driver's input drive axle torque Twd due to a driver's accelerator override.

A grade resistance calculating (or estimating) section 63 calculates a grade (or hill climbing) resistance from the command axle torque Twr of the vehicle speed control section 4 and the actual vehicle speed Vsp, and converts the calculated grade resistance to a grade resisting axle torque (or grade resistance indicative axle torque) Tdhg corresponding to the grade resistance.

An auxiliary (or grade resisting) brake actuation quantity (or auxiliary brake manipulated variable) calculating section 64 calculates a grade resisting brake fluid pressure Pbgr corresponding to the grade resistance.

An override detecting section (or driver's operation detecting section) 65 detects a driver's accelerator pedal operation and a driver's brake pedal operation.

A stop start control mode select section 66 determines a desired control mode during stoppage of the vehicle, or at the time of occurrence of override during stoppage, and produce a mode select signal.

A switching section 67 produces a command brake fluid pressure BRK_CMD and a command throttle opening TVO_CMD in accordance with the mode select signal of the stop start control section 66.

The thus-constructed longitudinal force control system is operated as follows: In the headway distance control system, the headway distance measuring section 1 of this example comprises a radar system and measures the vehicle-to-vehicle headway distance Lv from the controlled vehicle to a preceding vehicle ahead of the controlled vehicle. By using the vehicle speed Vsp of the controlled vehicle fed back from the vehicle speed sensor 10, a desired vehicle-to-vehicle time interval T, and a vehicle-to-vehicle distance Lo in a stop state, the headway distance command section 2 calculates the desired command headway distance Lr to the preceding vehicle according to the following equation.

$$Lr = Vsp \cdot T + Lo \qquad [\text{Exp. 1}]$$

Figure 4:
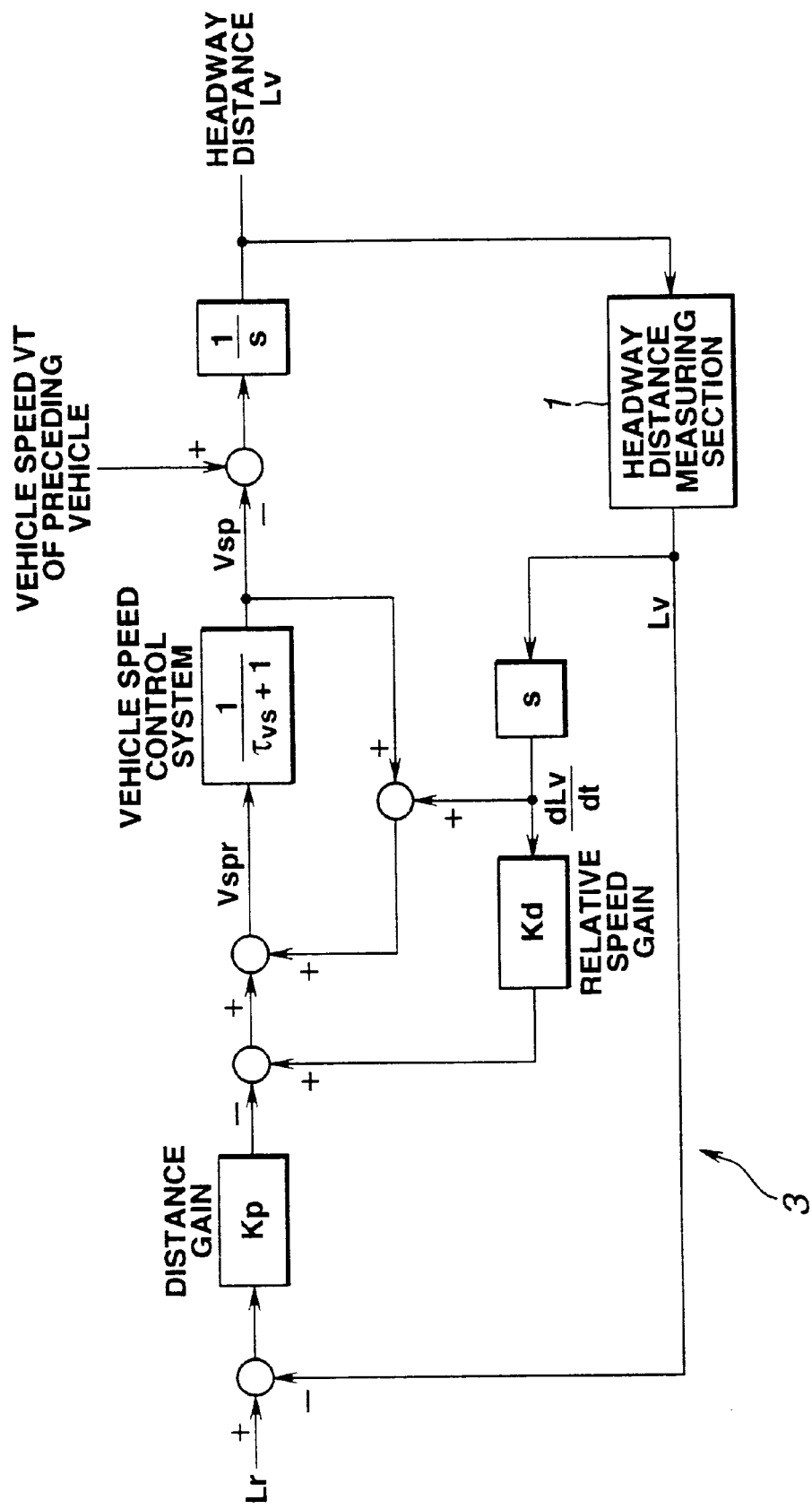
FIG. 4 is a block diagram showing a headway distance control section of FIG. 1.

The headway distance control section 3 calculates the command vehicle speed Vspr to reduce a deviation between the measured distance Lv and the command distance Lr. Assuming that the vehicle speed control system can be approximated by a first order lag system in which the response of the actual vehicle speed Vsp with respect to the command vehicle speed Vspr has a time constant $\tau v$ (=1/ω), the internal structure of the distance control section 3 is depicted in the form of control blocks as shown by in FIG. 4. A transfer characteristic from the command distance Lr to the actual distance Lv is given by the following mathematical expression 2.

$$Lv = \frac{\omega Kp}{s^2 + \omega(1 + Kd)s + \omega Kp} Lr + \frac{s}{s^2 + \omega(1 + Kd)s + \omega Kp} VT \quad [\text{Exp. 2}]$$

In this equation, s is the Laplace variable (differential operator used in the Laplace transform), VT is the vehicle speed of a preceding vehicle, Kd is a relative speed gain, and Kp is a vehicle-to-vehicle headway distance gain.

By setting Kd and Kp to appropriate values in this equation, this control system can change the pole, and obtains a desired follow-up response characteristic. Each gain is set to a fixed value experimentally determined in accordance with the vehicle model and make.

Alternatively, it is possible to store a plurality of values of each gain in the form of a data table, and to select an optimum value according to the circumstances from the table.

Figure 5:
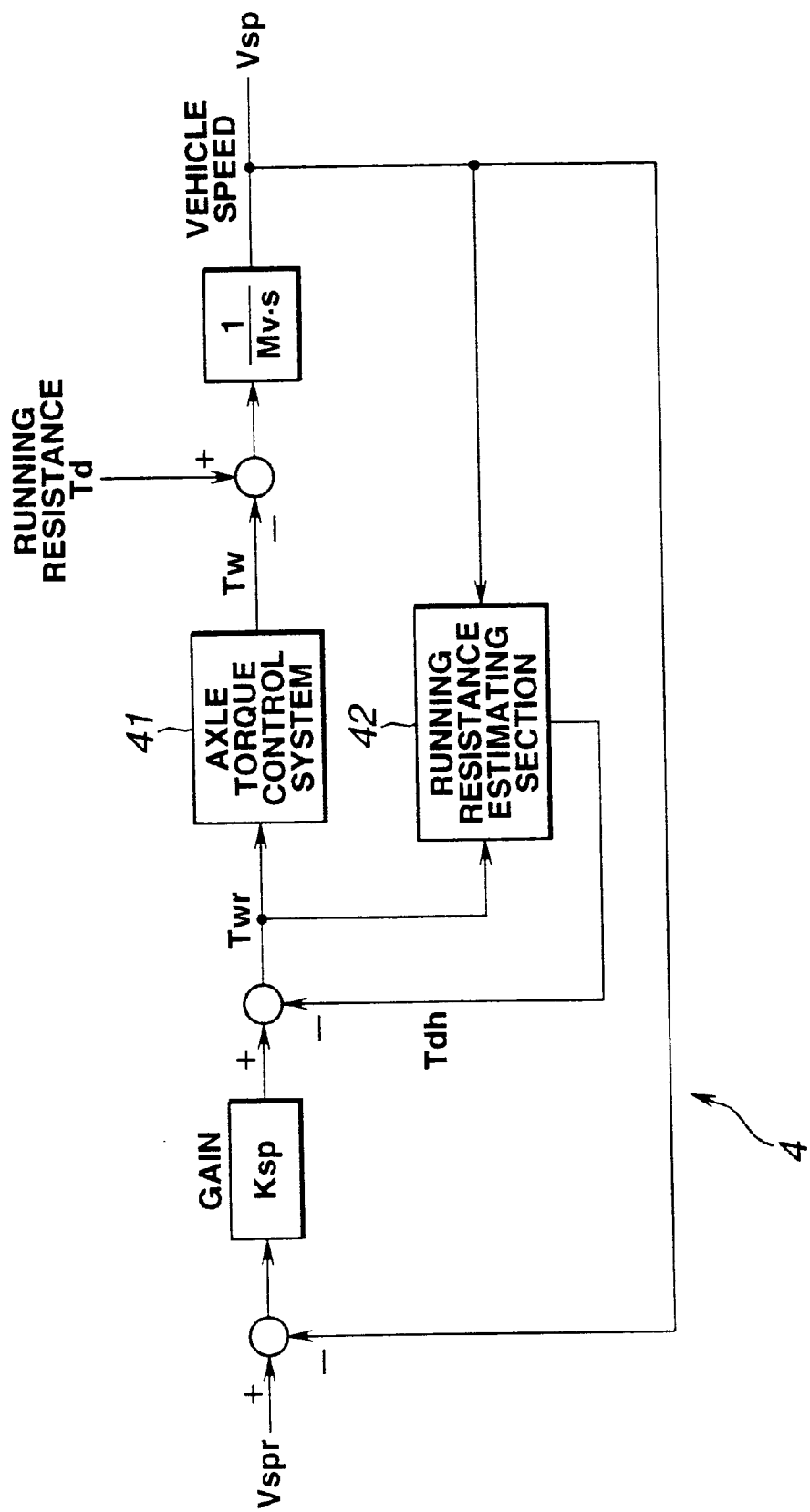
FIG. 5 is a block diagram showing a vehicle speed control section of FIG. 1.

The vehicle speed control section 4 calculates the command drive axle torque Twr required to reduce the deviation of the actual vehicle speed Vsp from the command vehicle speed Vspr determined by the distance control section 3, to zero. FIG. 5 shows the internal structure of the vehicle speed control section 4 in the form of control blocks. In this example, a transfer lag in a drive axle torque control system 41 is regarded as negligible. A running resistance estimating section 42 receives the command axle torque Twr and the vehicle speed Vsp as input signals. From these input signals, the estimating section 42 determines an estimated running resistance indicative axle torque Tdh which represents the running resistance in terms of the axle torque, by using the following mathematical expression 3, and feeds back the estimated axle torque Tdh to exclude influence of the grade resistance, air resistance and rolling resistance.

$$Tdh = H(s) \cdot Rw \cdot Mv \cdot s \cdot Vsp - H(s) \cdot Twr \quad [\text{Exp. 3}]$$

In this equation, Mv is a vehicle weight, Rw is a tire radius, and H(s) is a low pass filter with a steady--state gain of 1.

Assuming that disturbance to the control system is eliminated by this running resistance estimation based on the math expression 3, the transfer characteristic from the command vehicle speed Vspr to the actual vehicle speed Vsp is given by the following math expression 4.

$$Vsp = \frac{\frac{Ksp}{Mv}}{s + \frac{Ksp}{Mv}} Vspr \quad [\text{Exp. 4}]$$

By setting Ksp to an appropriate value in this equation, the vehicle speed control system can obtain a desired response characteristic.

Figure 6:
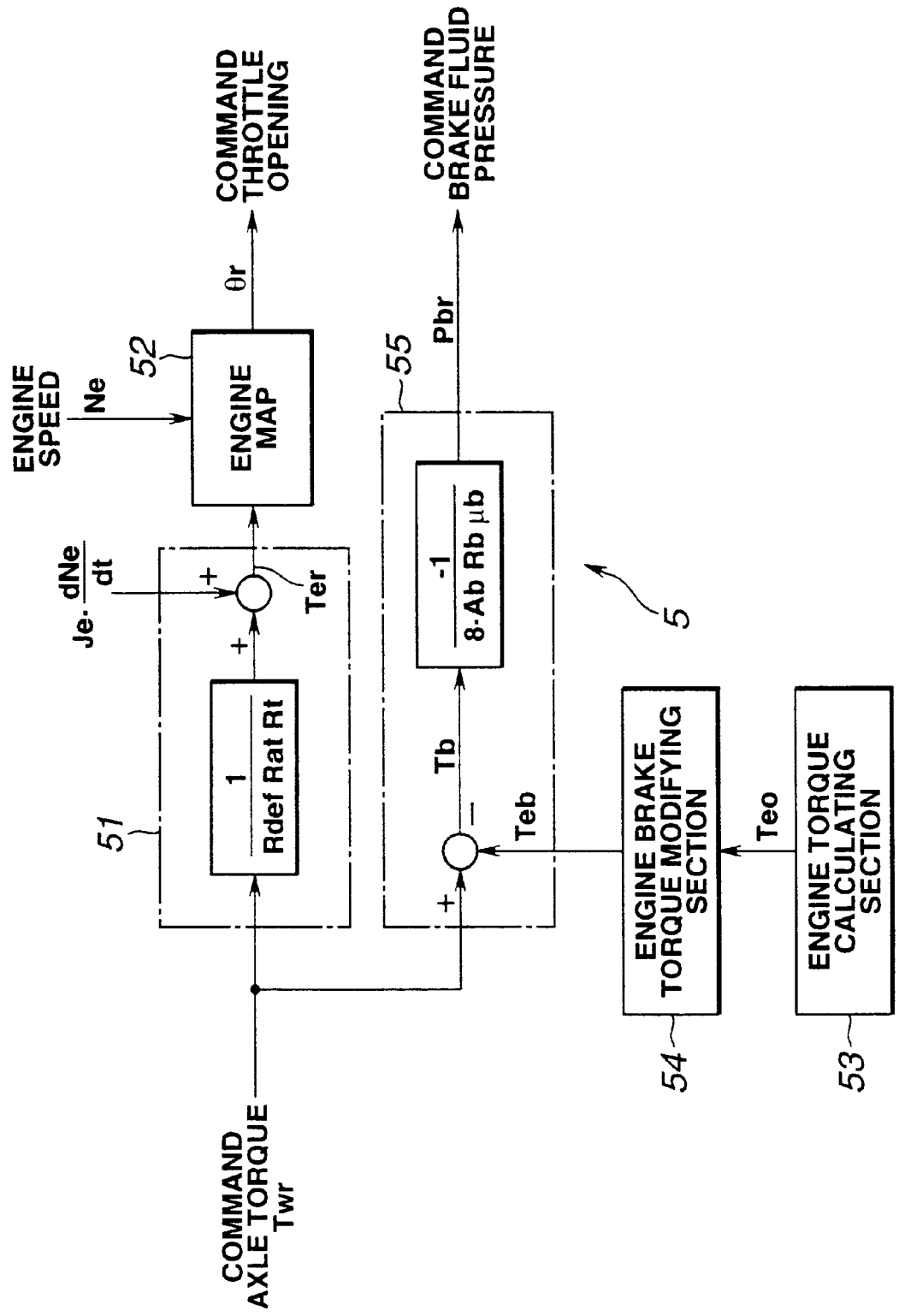
FIG. 6 is a block diagram showing an axle torque control section of FIG. 1.

The drive axle torque control section 5 calculates the command throttle opening θr and command brake pressure Pbr which are required to achieve the command axle torque Twr calculated by the vehicle speed control section 4. FIG. 6 shows the internal structure of the axle torque control section 5 in the form of control blocks.

By using a torque converter's torque multiplication factor Rt, an automatic transmission's gear ratio Rat, a differential's gear ratio Rdef, an engine inertia Je, an engine speed Ne and a later-mentioned command brake torque Tbr, a relation between a drive axle torque Tw and an engine torque Te is expressed by:

$$Tw = Rt \cdot Rat \cdot Rdef \cdot \left( Te - Je \cdot \frac{dNe}{dt} \right) - Tbr \quad [\text{Exp. 5}]$$

Figure 7:
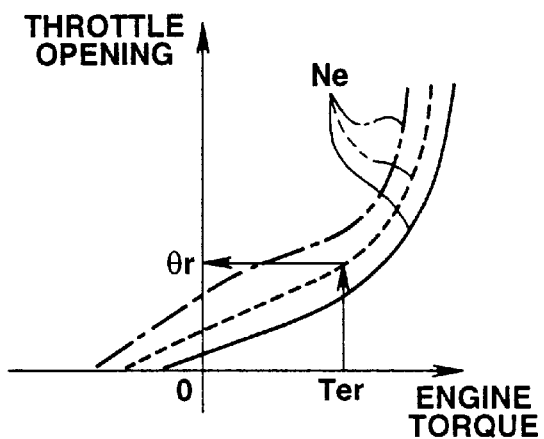
FIG. 7 is a graph showing a table map used in the control system of FIG. 1, to determine a throttle opening from an engine torque.

Therefore, the axle torque control section 5 can calculate a command engine torque Ter from the command drive axle torque Twr according to the following math expression 6, and determines a throttle opening or to produce this command engine torque Ter by using an engine data map shown in FIG. 7.

$$Ter = Je \cdot \frac{dNe}{dt} + \frac{1}{Rt \cdot Rat \cdot Rdef} \cdot Twr \quad [\text{Exp. 6}]$$

When the thus-determined command throttle opening θr is equal to or greater than zero, then the longitudinal force control system can produce an actual torque as dictated by the command axle torque Twr with the engine torque alone without using the brake. When, on the other hand, the command throttle opening θr is equal to or smaller than zero, the longitudinal force control system sets the throttle opening to zero, and calculates a brake actuating quantity (or a manipulated variable to the brake) to make the actual drive axle torque equal to the command axle torque Twr in consideration of the drive axle torque being produced by the engine.

Thus, a distributive control law of the command engine torque. Ter and the command brake torque Tbr is as follows:

(A) When the command throttle opening θr is greater than zero (θr>0):

$$Tbr = 0 \quad [\text{Exp. 7}]$$

$$Tw = Rt \cdot Rat \cdot Rdef \cdot \left( Te - Je \cdot \frac{dNe}{dt} \right)$$

Therefore, the engine torque Te required for the command axle torque Twr is given by:

$$Te = Je \cdot \frac{dNe}{dt} + \frac{1}{Rt \cdot Rat \cdot Rdef} \cdot Twr \quad [\text{Exp. 8}]$$

In this case, the brake actuating quantity is equal to zero from the mathematical expression 5.

(B) When the command throttle opening θr is zero (θr=0):

By using an engine torque Teo in the condition of the throttle opening being equal to zero, the expression 5 is rewritten as:

$$Tw = Rt \cdot Rat \cdot Rdef \cdot \left( Teo - Je \cdot \frac{dNe}{dt} \right) - Tbr \quad [\text{Ex. 9}]$$

Therefore, the brake torque Tbr required for the command drive axle torque Twr is given by the following mathematical expression 10.

$$Tbr = Twr - Rt \cdot Rat \cdot Rdef \cdot \left( Teo - Je \cdot \frac{dNe}{dt} \right) \quad [\text{Exp. 10}]$$
$$= Twr - Teb$$

In this equation, Teb is a torque due to engine braking.

By using a brake cylinder area Ab, an effective rotor radius Rb and a pad friction coefficient μb, the following mathematical expression 11 gives the brake actuating quantity (manipulated variable) in the form of the command brake fluid pressure Pbr, required to achieve the command brake torque Tbr.

$$Pbr = \frac{-1}{8 \cdot Ab \cdot Rb \cdot \mu b} \cdot Tbr \qquad \text{[Exp. 11]}$$

In this equation, a numerical value of 8 is the result of multiplication 4×2 in the case of a four-wheel vehicle provided with a brake actuating unit having two brake pads on both sides for each wheel.

Figure 9:
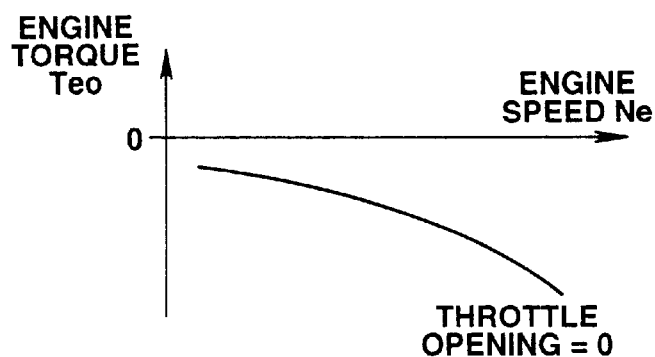
FIG. 9 is a graph showing an engine map used in the control system of FIG. 1 when the throttle opening is zero.

These operations are performed in the axle torque control section 5 as shown in FIG. 6. A command engine torque calculating section 51 calculates the command engine torque Ter by using the math expression 8. A command throttle opening calculating section 52 calculates the command throttle opening θr to produce the command engine torque Ter from the command engine torque Ter and the engine speed Ne by using the engine map as shown in FIG. 7. Then, a minimum throttle engine torque calculating section 53 calculates the (minimum throttle) engine torque Teo obtained when the throttle opening is zero (at a minimum setting), by using an engine map as shown in FIG. 9. An engine brake torque modifying section 54 calculates the second term (Teb) on the right side of the equation of the expression 10. A braking force calculating section 55 performs addition of the first and second terms on the right side of the equation of the expression 10, and calculates the command brake fluid pressure Pbr according to the math equation 11.

The starting brake control section 6 shown in FIG. 3 operates as follows:

The vehicle stop detecting section 61 monitors the command vehicle speed Vspr, the measured vehicle speed Vsp and the headway distance error Lv−Lr, and determines whether the controlled vehicle is stopped by the headway distance control, by using the following relationships.

$$Vspr < \Delta 1$$
$$Vsp < \Delta 2$$
$$Lv - Lr < \Delta 3 \qquad \text{[Exp. 12]}$$

When the command vehicle speed Vspr, the measured actual vehicle speed Vsp and the headway distance error Lv−Lr are all within the respective sufficiently small regions of Δ1, Δ2 and Δ3, the vehicle stop detecting section 61 judges that the controlled vehicle is in the stop state, and sets a stop flag FLG_STP1 to "1". If any one or more of the three conditions of the expression 12 is unsatisfied, then the stop flag FLG_STP1 is reset to "0".

The driver's input driving force calculating section 62 calculates the driver's input drive axle torque Twd due to a driver's accelerator pedal input. The relation between the engine torque Te and the drive axle torque Tw is given by the expression 7. Therefore, the driver's input axle torque Twd produced by the driver's accelerator pedal operation is given by:

$$Twd = Rt \cdot Rat \cdot Rdef \cdot \left( Ted - Je \cdot \frac{dNe}{dt} \right) \qquad \text{[Exp. 13]}$$

Figure 8:
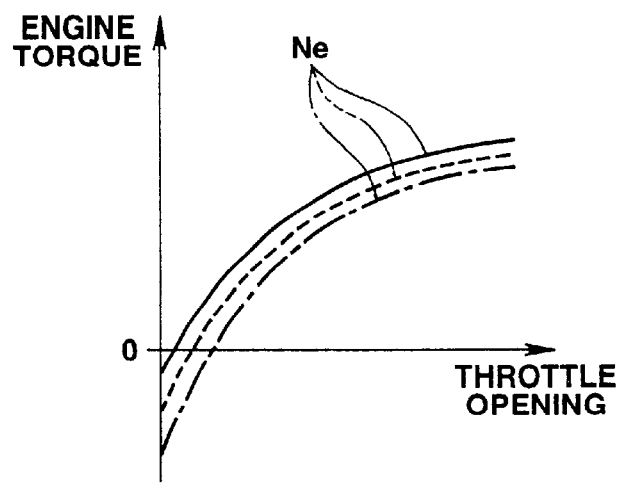
FIG. 8 is a graph showing a table map used in the control system of FIG. 1, to determine the engine torque from the throttle opening.

In this equation, Ted is an engine torque produced by the driver's accelerator pedal operation. In this case, too, the engine torque Ted is determined by using the table map of the engine torque shown in FIG. 8.

The grade resistance calculating (or estimating) section 63 uses the command drive axle torque Twr outputted from the vehicle speed control section 4, the measured vehicle speed Vsp, and vehicle specification data items of the controlled vehicle, and thereby determines the running resistance due to the road grade (or slope), as a quantity Tdh2 in terms of the drive axle torque. This running resistance indicative axle torque Tdh2 is given by the following math expression 14 similar to the math expression 3.

$$Tdh2 = H(s) \cdot Rw \cdot Mv \cdot s \cdot Vsp - H(s) \cdot Twr \qquad \text{[Exp. 14]}$$

This expression includes all the resistances inclusive of the air resistance and the rolling resistance. Therefore, the aerodynamic resistance and the rolling resistance are subtracted in the following manner. The air resistance Fa and the rolling resistance Fr are calculated according to the following math expression 15.

$$Fa = \mu a \cdot Sv \cdot Vsp^2$$
$$Fr = \mu r \cdot Mv \cdot g \qquad \text{[Exp. 15]}$$

In these equations, $\mu a$ is an air resistance coefficient (corresponding to an aerodynamic drag coefficient), Sv is a frontal projected area of the vehicle, $\mu r$ is a rolling resistance coefficient, Mv is a vehicle weight, and g is a gravitational acceleration. Therefore, the grade resistance indicative axle torque Tdhg representing the grade resistance is given by:

$$Tdhg = Tdh2 \cdot Rw \cdot (Fa + Fr) \qquad \text{[Exp. 16]}$$

When the vehicle comes to a stop and the stop detecting section 61 operates to signal the stop of the vehicle, the grade resistance calculating section 63 receives a grade resistance latch flag FLG_TD_LAT from the stop start control mode selecting section 66 and stops the calculation of the grade resistance. While the vehicle is at rest, the calculation of the grade resistance is inhibited to avoid the inaccuracy in the grade resistance calculation during vehicle stoppage.

The auxiliary brake actuating quantity (or manipulated variable) calculating section 64 receives the grade resistance indicative axle torque Tdhg from the grade resistance calculating section 63, and calculates a brake actuating quantity (manipulated variable) required to produce a braking torque Tbgr equaling the axre torque Tdhg. In this example, the brake actuating quantity is in the form of a brake fluid pressure Pbgr. When the throttle opening is equal to zero, the math expression 10 gives a braking torque corresponding to a given drive axle torque Twr. Therefore, the use of the grade resistance indicative axle torque Tdhg in substitution for the axle torque Twr in the math expression 10 yields the following math expression 17 used for calculating the braking torque Tbgr.

$$Tbgr = Tdhg - Rt \cdot Rat \cdot Rdef \cdot \left( Teo - Je \cdot \frac{dNe}{dt} \right) \qquad \text{[Exp. 17]}$$

The following math expression 18 gives the command brake fluid pressure Pbgr required to produce the braking torque Tbgr.

$$Pbgr = \frac{-1}{8 \cdot Ab \cdot Rb \cdot \mu b} \cdot Tbgr \qquad \text{[Exp. 18]}$$

The override detecting section 65 detects a driver's brake pedal operation or a driver's accelerator pedal operation. By monitoring an output signal of a pressure sensor attached to each pedal and control errors (or deviations) in the throttle servo system and brake servo system, the override detecting section 65 detects the occurrence of an override, and produces an accelerator pedal operation flag FLG_OVR_TH and a brake pedal operation flag FLG_OVR_BRK. The accelerator pedal operation flag FLG_OVR_TH is equal to one in the case of existence of an accelerator pedal operation, and equal to zero in the case of nonexistence of an accelerator pedal operation. The brake pedal operation flag FLG_OVR_BRK is equal to one in the case of existence of a brake pedal operation, and equal to zero in the case of nonexistence of a brake pedal operation.

The stop start control mode selecting section 66 receives the stop flag FLG_STP1 from the vehicle stop detecting section 61, the calculated driver's input axle torque Twd from the driver's input axle torque calculating section 62, and the flags FLG_OVR_TH and FLG_OVR_BRK from the override detecting section 65, and sends mode select signals to the switching section 67 by performing a mode selecting control needed for a vehicle holding operation for holding the vehicle in the stop condition or a vehicle starting operation for starting the vehicle in response to a driver's accelerator pedal operation.

Figure 10:
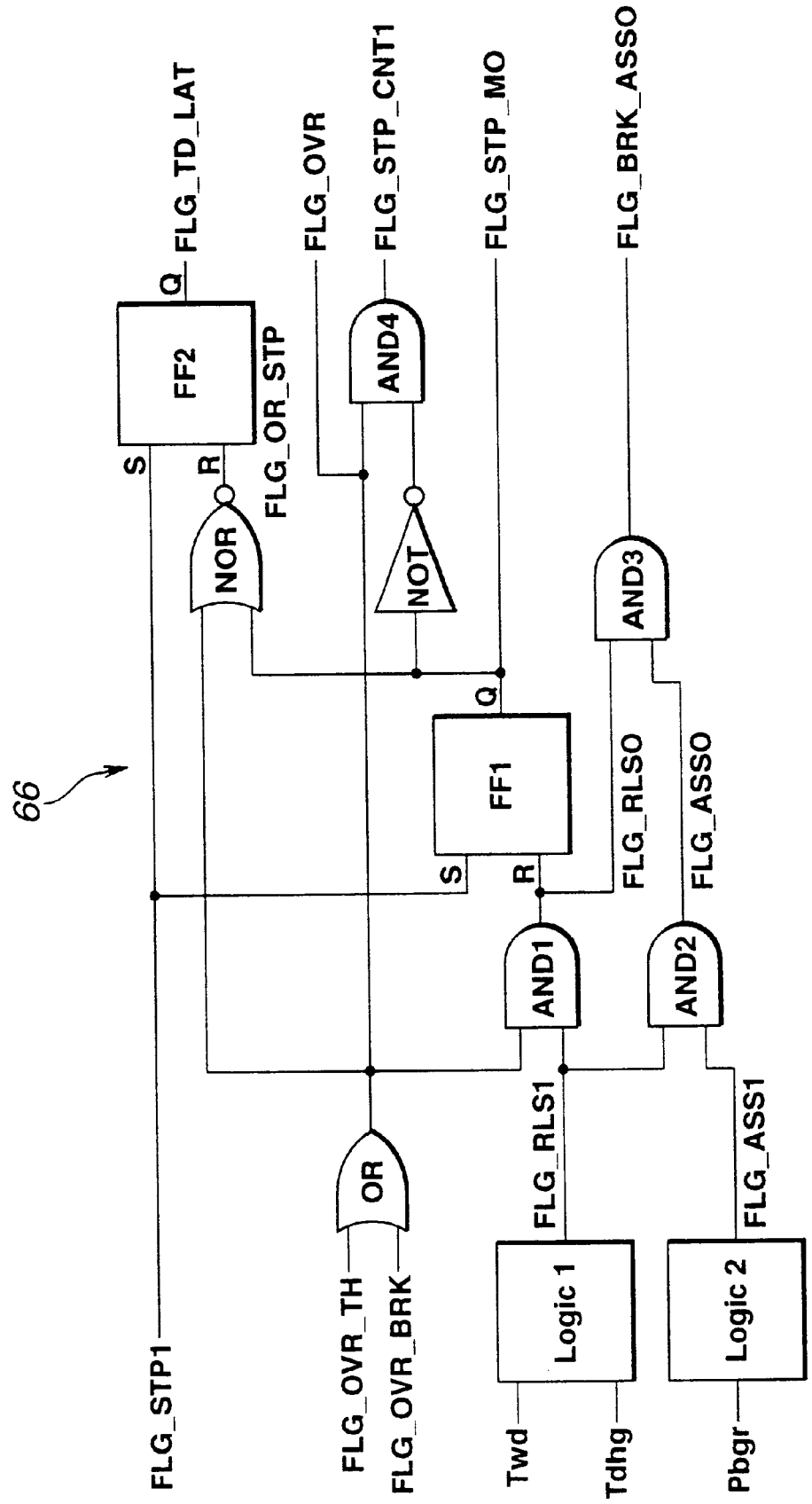
FIG. 10 is a logic circuit diagram showing an internal logic configuration in a stop start control mode selecting section shown in FIG. 3.

FIG. 10 shows the operational blocks in the stop start control mode selecting section 66. Assuming that the vehicle encounters the following situations, the block elements of the section 66 function as follows:

First situation in which a preceding vehicle stops on a uphill grade, and then the controlled vehicle is brought to a stop by the automatic inching control on the uphill grade which is too steep to start the vehicle only by the force of creep:

When, in the first situation, the command vehicle speed Vspr becomes lower than Δ1, the actual vehicle speed Vsp of the controlled vehicle becomes lower than Δ2, and at the same time the headway distance error Lv–Lr becomes smaller than Δ3, then the stop detecting section 61 sets the vehicle stop flag FLG_STP1 to one (FLG_STP1=1).

An OR circuit of FIG. 10 receives the override flags FLG_OVR_TH and FLG_OVR_BRK as input signals, and produces an output override flag FLG_OVR. In the first situation, there is no override, and hence the override flags FLG_OVR_TH and FLG_OVR_BRK are both equal to zero. As a result, the output override flag FLG_OVR is equal to zero (FLG_OVR=0).

Figure 11A:
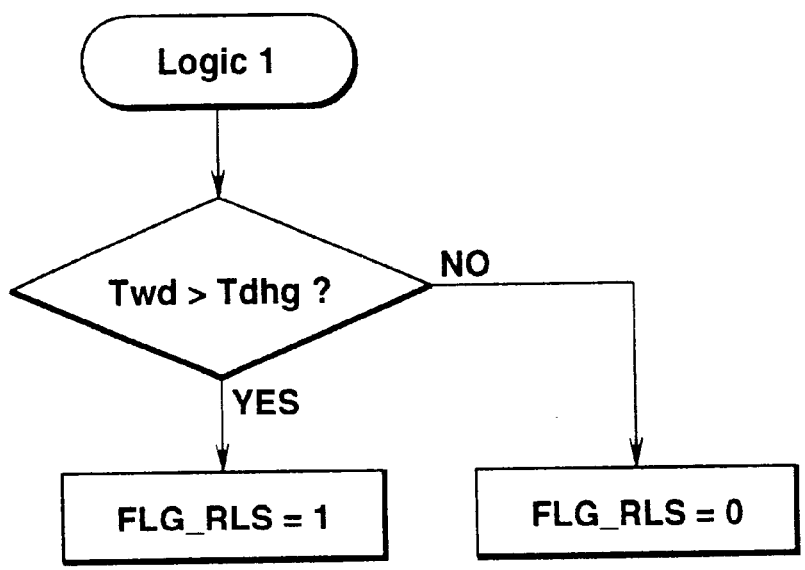
FIGS. 11A and 11B are flowcharts showing procedures in first and second logic circuits shown in FIG. 10.

A first logic circuit (Logic 1) performs a procedure shown in FIG. 11A and thereby determines whether the calculated driver's accelerator input axle torque Twd is greater than the grade resisting axle torque Tdhg. In the first situation, there is no override, and the force of creep is insufficient to start the vehicle along the ascending slope of the road. Therefore, Twd<Tdhg, and an output flag FLG_RLS1 of the first logic circuit is zero (FLG_RLS1=0).

Figure 11B:
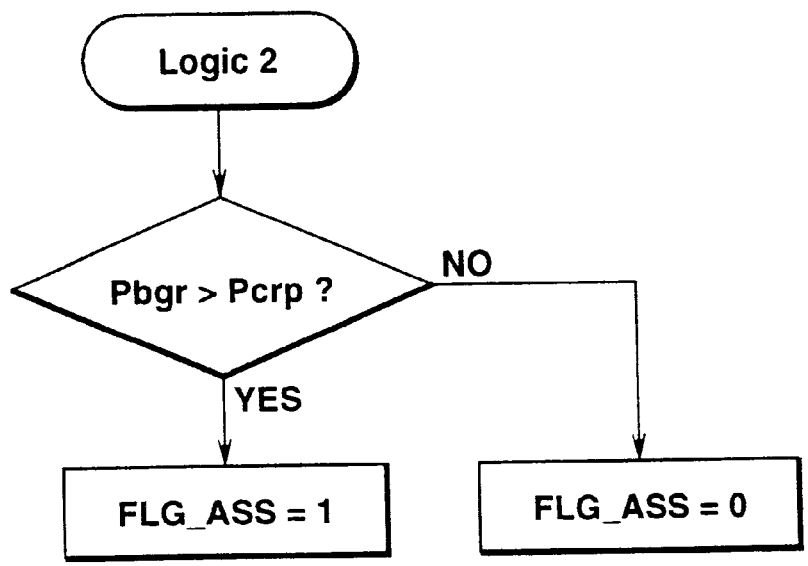

A second logic circuit (Logic 2) performs a procedure shown in FIG. 11B, and thereby determines whether the brake fluid pressure Pbgr for producing the grade resistance indicative axle torque Tdhg is greater than a predetermined pressure value Pcrp (a brake fluid pressure producing a braking torque equaling the creep torque). In the first situation under the assumption, the grade is ascending, and the brake fluid pressure Pbgr is negative. Therefore, Pbgr<Pcrp and an output flag FLG_ASS1 of the second logic circuit is zero (FLG_ASS1=0).

In a first AND circuit (AND1), two inputs are FLG_RLS1=0 and FLG_OVR=0, and hence an output is FLG_RLS0=0.

In a second AND circuit (AND2), two inputs are FLG_RLS1=0 and FLG_ASS1=0, and hence an output is FLG_ASS0=0.

In a third AND circuit (AND3), two inputs are FLG_RLS0=0 and FLG_ASS0=0, and hence an output is FLG_BRK_ASS0=0.

In a first flip-flop circuit (FF1), an R input is FLG_RLS0=0, and therefore, a Q output goes to one when an S input FLG_STP1 goes to one (FLG_STP1=1). Therefore, FLG_STP_M0=1.

In a NOR circuit, two inputs are FLG_OVR=0 and FLG_STP_M0=1, and hence an output is FLG_OR_STP=0.

In a second flip-flop circuit (FF2), an R input is FLG_OR_STP=0, and therefore, a Q output goes to one when an S input FLG_STP1 goes to one (FLG_STP1=1). Therefore, FLG_TD_LAT=1. This flag FLG_TD_LAT, when set to one, latches the estimated grade resistance so that the estimated grade resistance remains fixed at a constant value.

In a fourth AND circuit (AND4), FLG_OVR=0 and the inverted signal of FLG_STP_M0 is "0", and therefore FLG_STP_CNT1=0.

Figure 12:
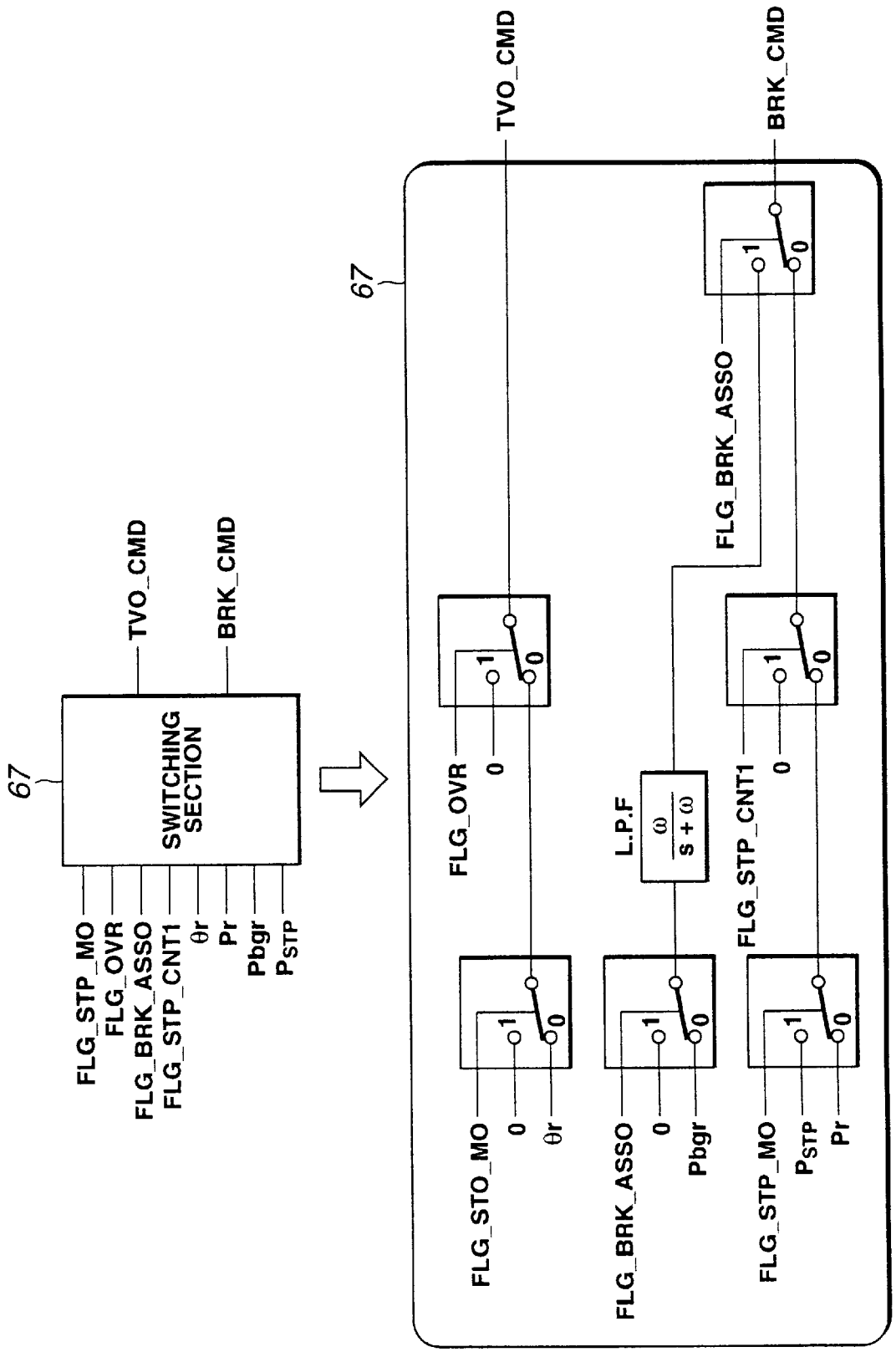
FIG. 12 is a circuit diagram showing an internal structure in a switching section 67 shown in FIG. 3.

Therefore, the switching section 67, as shown in FIG. 12 more in detail, receives the input signals of FLG_STP_M0=1, FLG_OVR=0, FLG_BRK_ASS0=0, and FLG_STP_CNT1=0. As a result, the switching section 67 produces output signals of TVO_CMD=0 (the throttle opening corresponding to the driver's accelerator pedal operation) and BRK_CMD=Pstp. The brake system produce the brake fluid pressure at a constant level for stopping the vehicle, and brings the vehicle to a complete stop.

Second situation where, on the ascending slope, a turn signal of the preceding vehicle flashes to indicate the intention of turning aside from the heading lane to another lane, and the driver of the controlled vehicle starts the vehicle by depressing the accelerator pedal. In this case, it is assumed that the headway distance error Lv–Lr is smaller than Δ3, and FLG_STP1 remains equal to one.

(I) When Twd<Tdhg

When the calculated driver's accelerator input axle torque Twd is smaller than the grade resistance indicative axle torque Tdhg, the stop start control mode selecting section 66 operates as follows.

In the OR circuit of FIG. 10, occurrence of an override causes FLG_OVR to go to one (FLG_OVR=1).

In the first logic circuit (Logic 1), FLG_RLS1=0 since Twd<Tdhg.

In the second logic circuit (Logic 2), FLG_ASS1=0 since the brake fluid pressure Pbgr is negative because of the ascending slope, and hence Pbgr<Pcrp.

In the first AND circuit (AND 1), FLG_RLS=0 and FLG_OVR=1, so that FLG_RLS0=0.

In the second AND circuit (AND 2), FLG_RLS1=0 and FLG_ASS1=0, so that FLG_ASS0=0.

In the third AND circuit (AND 3), FLG_RLS0=0 and FLG_ASS0=0, so that FLG_BRK_ASS0=0.

In the first flip-flop circuit (FF 1), the input condition of FLG_RLS=0 continues, so that the output condition of FLG_STP_M0=1 continues.

In the NOR circuit, FLG_OVR=1 and FLG_STP_M0=1, so that FLG_OR_STP=0.

In the second flip-flop circuit (FF2), the input condition of FLG_OR_STP=0 continues, so that the output condition of FLG_TD_LAT=1 continues. Therefore, the estimated grade resistance quantity (Tdhg) remains fixed.

In the fourth AND circuit (AND4), $FLG_{13}$ OVR=1 and the inverted signal of FLG_STP_M0 is "0", so that FLG_STP_CNT1=0.

Therefore, in the switching section 67 shown in FIG. 12, the input conditions are FLG_STP_M0=1, FLG_OVR=1, FLG_BRK_ASS0=0, and FLG_STP_CNT1=0. As a result, the output conditions of the switching section 67 are TVO_CMD=0 and BRK_CMD=Pstp. The brake system continues producing the brake fluid pressure at the constant level for holding the vehicle stationary, and prevents the vehicle from moving backwards even if the throttle opening is too small to prevent backward descending.

(II) When Twd>Tdhg

When the calculated driver's accelerator input axle torque Twd is greater than the grade resistance indicative axle torque Tdhg, the stop start control mode selecting section 66 operates as follows.

In the OR circuit, the occurrence of an override causes the override flag FLG_OVR to go to one (FLG_OVR=1).

In the first logic circuit (Logic 1), FLG_RLS1=1 since Twd>Tdhg.

In the second logic circuit (Logic 2), the output flag FLG_ASS1 is zero (FLG_ASS1=0) since the brake fluid pressure Pbgr is negative because of the ascending slope, and hence Pbgr<Pcrp.

In the first AND circuit (AND 1), FLG_RLS1=1 and FLG_OVR=1, so that FLG_RLS0=1.

In the second AND circuit (AND 2), FLG_RLS1=1 and FLG_ASS1=0, so that FLG_ASS0=0.

In the third AND circuit (AND 3), FLG_RLS0=1 and FLG_ASS0=0, so that FLG_BRK_ASS0=0.

In the first flip-flop circuit (FF 1), FLG_RLS0=1, so that FLG_STP_M0=0.

In the NOR circuit, FLG_OVR=1 and FLG_STP_M0=0, so that FLG_OR_STP=0.

In the second flip-flop circuit (FF2), the input condition of FLG_OR_STP=0 continues, so that the output condition of FLG_TD_LAT=1 continues. Therefore, the estimated grade resistance quantity remains fixed.

In the fourth AND circuit (AND4), FLG_OVR=1 and the inverted signal of FLG_STP_M0 is "1", so that FLG_STP_CNT1=1.

Therefore, in the switching section 67 shown in FIG. 12, the input conditions are FLG_STP_M0=0, FLG_OVR=1, FLG_BRK_ASS0=0, and FLG_STP_CNT1=1. As a result, the output conditions of the switching section 67 are TVO_CMD=0 (to allow the throttle opening corresponding to the driver's accelerator pedal operation) and BRK_CMD=0 (to allow the brake fluid pressure corresponding to the driver's brake pedal operation). The brake system removes the brake fluid pressure of the constant level, and allows the vehicle to start in response to the driver's accelerator pedal operation.

Figure 13:
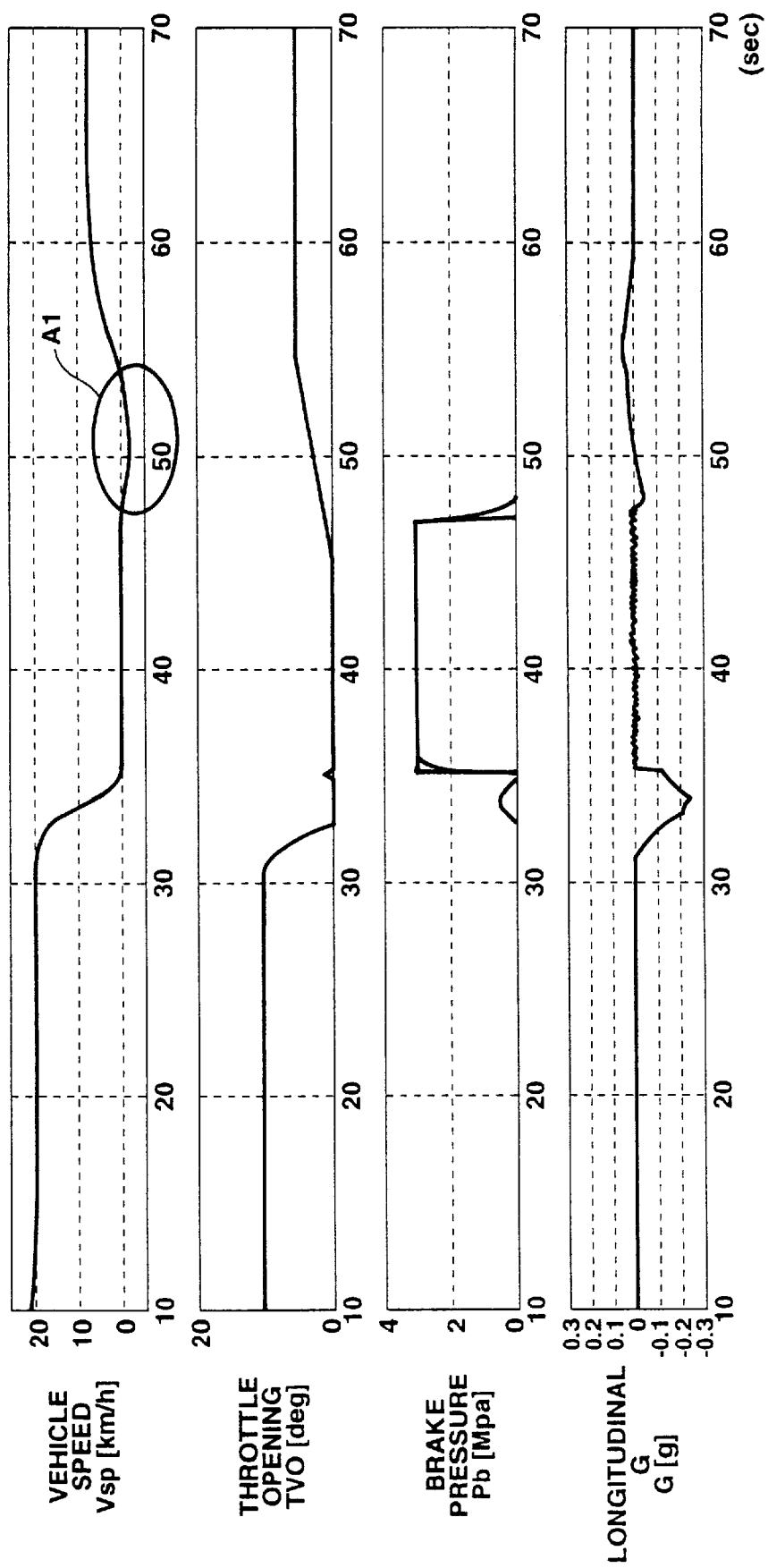
FIG. 13 is a graph showing the results of simulation of vehicle behavior in a comparable example when an accelerator override occurs in a stop condition by an automatic inching control on an uphill grade.
Figure 14:
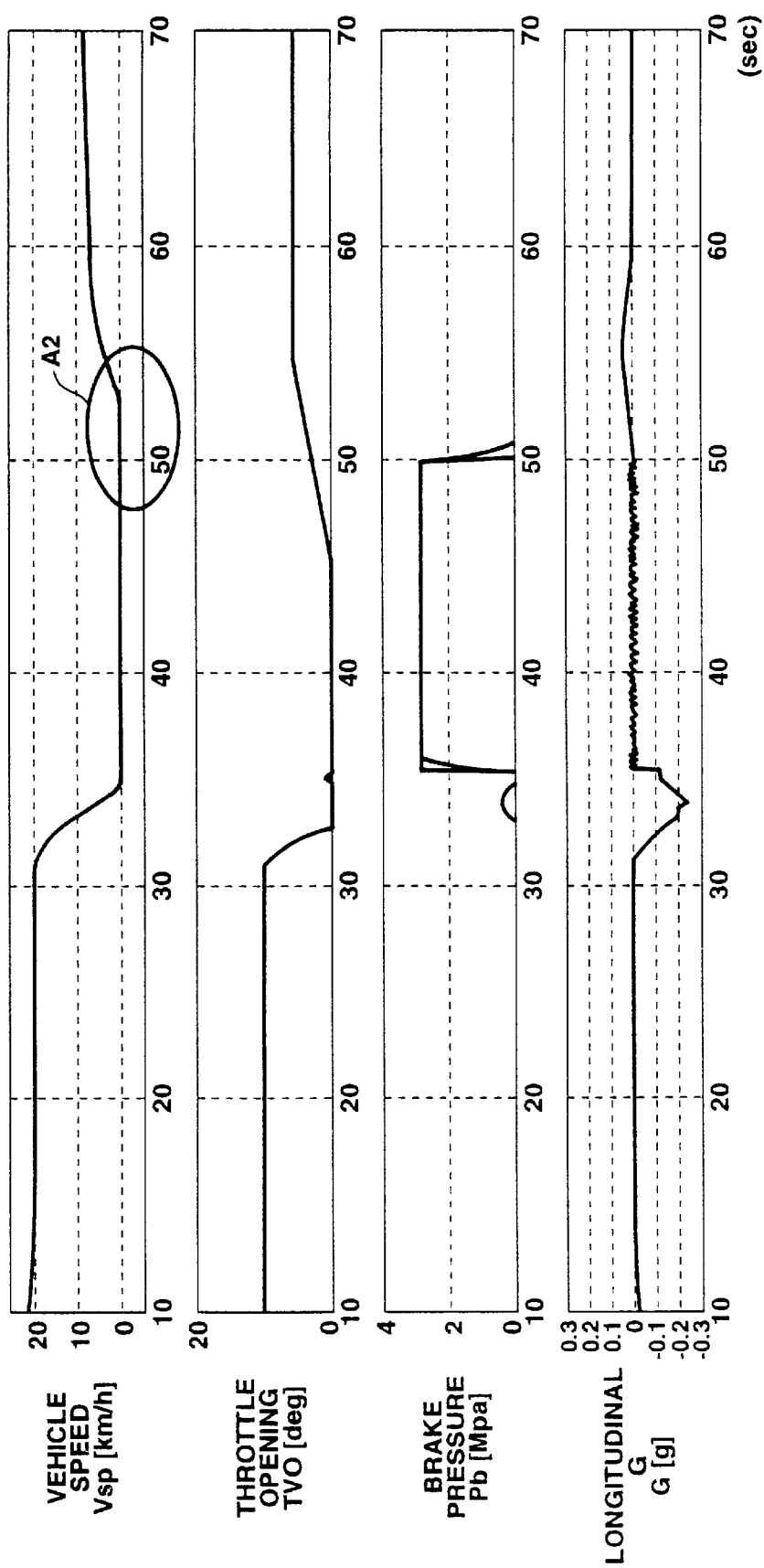
FIG. 14 is a graph showing the results of simulation of vehicle behavior in the example according to the embodiment of the present invention when an accelerator override occurs in the stop condition by the automatic inching control on an uphill grade.

FIGS. 13 and 14 show the results of simulation for vehicle behavior obtained when the accelerator pedal is depressed in the state in which the vehicle is stopped on an ascending slope by the automatic inching control. FIG. 13 shows the results of a comparable example, and FIG. 14 shows the results of the control system according to this embodiment of the present invention. In the comparable example of FIG. 13, the brake for holding the vehicle in the stop condition is released immediately when an accelerator override occurs at a point of 45 sec. Therefore, the vehicle moves backwards and the vehicle speed becomes negative as shown at A1 in FIG. 13 in a small throttle opening region. In the example according to the present invention, by contrast, the stop holding brake is not released until the driving force becomes equal to or greater than the grade resistance. Therefore, the vehicle can start smoothly without unwanted backward movement, as shown at A2 in FIG. 14.

Third situation in which a preceding vehicle stops on a downhill grade, and then the controlled vehicle is brought to a stop by the automatic inching control:

When, in the third situation, the command vehicle speed Vspr becomes lower than Δ1, the actual vehicle speed Vsp of the controlled vehicle becomes lower than Δ2, and at the same time the headway distance error Lv−Lr becomes smaller than Δ3, then the stop detecting section 61 sets the vehicle stop flag FLG_STP1 to one (FLG_STP1=1). The stop start control mode selecting section 66 is operated in the following manner.

In the OR circuit, FLG_OVR=0 since there is no override.

In the first logic circuit (Logic 1), Twd is equal to a calculated axle torque of the creep in the state in which the throttle opening is zero, and Tdhg is negative on the descending slop, so that Twd>Tdhg and FLG_RLS1=1.

In the second logic circuit (Logic 2), the brake pressure Pbgr required to produce the grade resistance indicative axle torque Tdhg is compared with the predetermined value Pcrp (which is the brake fluid pressure value to produce a brake torque equaling the creep torque). On the descending slope, Pbgr>Pcrp, and FLG_ASS1=1.

In the first AND circuit (AND1), FLG_RLS1=1 and FLG_OVR=0, so that FLG_RLS0=0.

In the second AND circuit (AND2), FLG_RLS1=1 and FLG_ASS1=1, so that FLG_ASS0=1.

In the third AND circuit (AND3), FLG_RLS0=0 and FLG_ASS0=1, so that FLG_BRK_ASS0=0.

In the first flip-flop circuit (FF1), FLG_STP1=1 and FLG_RLS0=0, so that FLG_STP_M0=1.

In the NOR circuit, FLG_OVR=0 and FLG_STP_M0=1, so that FLG_OR_STP=0.

In the second flip-flop circuit (FF2), FLG_STP1=1 and FLG_OR_STP=0, so that FLG_TD_LAT=1. Therefore, the estimated grade resistance quantity is latched at the constant value.

In the fourth AND circuit (AND4), FLG_OVR=0 and the inverted signal of FLG_STP_M0 is "0", and therefore FLG_STP_CNT1=0.

Therefore, the switching section 67 receives the input signals of FLG_STP_M0=1, FLG_OVR=0, FLG_BRK_ASS0=0, and FLG_STP_CNT=0. As a result, the switching section 67 produces the output signals of TVO_CMD=0 (the throttle opening corresponding to the driver's accelerator pedal operation) and BRK_CMD=Pstp. The brake system produce the brake fluid pressure at a constant level for stopping the vehicle, and brings the vehicle to a complete stop.

Fourth situation where, on the descending slope, a turn signal of the preceding vehicle flashes to indicate the intention of turning aside from the heading lane to another lane, and the driver of the controlled vehicle starts the vehicle by depressing the accelerator pedal. In this case, it is assumed that the headway distance error is smaller than Δ3, and FLG_STP1 remains equal to one. The stop start control mode selecting section 66 is operated in the following manner.

In the OR circuit of FIG. 10, the occurrence of an override causes FLG_OVR to go to one (FLG_OVR=1).

In the first logic circuit (Logic 1), Twd>>0 because of the occurrence of override, and Tdhg is negative in the case of the descending slope, so that Twd>Tdhg and hence the condition of FLG_RLS1=1 continues.

In the second logic circuit (Logic 2), the condition of Pbgr>Pcrp continues because of the descending slope, and the condition of FLG_ASS1=1 continues.

In the first AND circuit (AND 1), FLG_RLS1=1 and FLG_OVR=1, so that FLG_RLS0=1.

In the second AND circuit (AND 2), FLG_RLS1=1 and FLG_ASS1=1, so that FLG_ASS0=1.

In the third AND circuit (AND 3), FLG_RLS0=1 and FLG_ASS0=1, so that FLG_BRK_ASS0=1.

In the first flip-flop circuit (FF 1), FLG_STP=1, FLG_RLS0=1, so that FLG_STP_M0=0.

In the NOR circuit, FLG_OVR=1 and FLG_STP_M0=0, so that FLG_OR_STP=0.

In the second flip-flop circuit (FF2), FLG_STP1=1 and FLG_OR_STP=0, so that FLG_TD_LAT=1. Therefore, the estimated grade resistance quantity remains fixed.

In the fourth AND circuit (AND 4), FLG_OVR=1 and the inverted signal of FLG_STP_M0 is "1", so that FLG_STP_CNT1=1.

Therefore, in the switching section 67 shown in FIG. 12, the input conditions are FLG_STP_M0=0, FLG_OVR=1, FLG_BRK_ASS0=1, and FLG_STP_CNT1=1. As a result, on the output side of the switching section 67, TVO_CMD=0, and BRK_CMD decreases stepwise, like a step change, from PSTP to Pbgr. Then, the brake fluid pressure decays to zero at a rate of decrease determined by a time constant 1/$\omega$ of a low pass filter L.P.F with a constant steady-state gain. Thus, on the occurrence of override on a downhill slope, the brake fluid pressure decreases sharply to a value counterbalancing the force due to the downhill slope, and thereafter the brake fluid pressure further decreases gradually to zero. Therefore, this control system can prevent abrupt acceleration, and improve the controllability and riding comfort of the vehicle.

In this case, it is possible to determine the speed of the accelerator opening (that is, the speed of accelerator pedal depression), and to vary the speed at which the brake fluid pressure is decreased to zero, in accordance with the speed of the accelerator opening. This adjustment helps prevent undesired drag of the brake.

The desired value of $\omega$ in the time constant 1/$\omega$ of L.D.P differs in dependence of the makes of vehicles, and $\omega$ is set equal to an experimentally determined value. For the purpose of simplification, it is preferable to set $\omega$ to a constant value preliminarily determined for each vehicle make.

Figure 15:
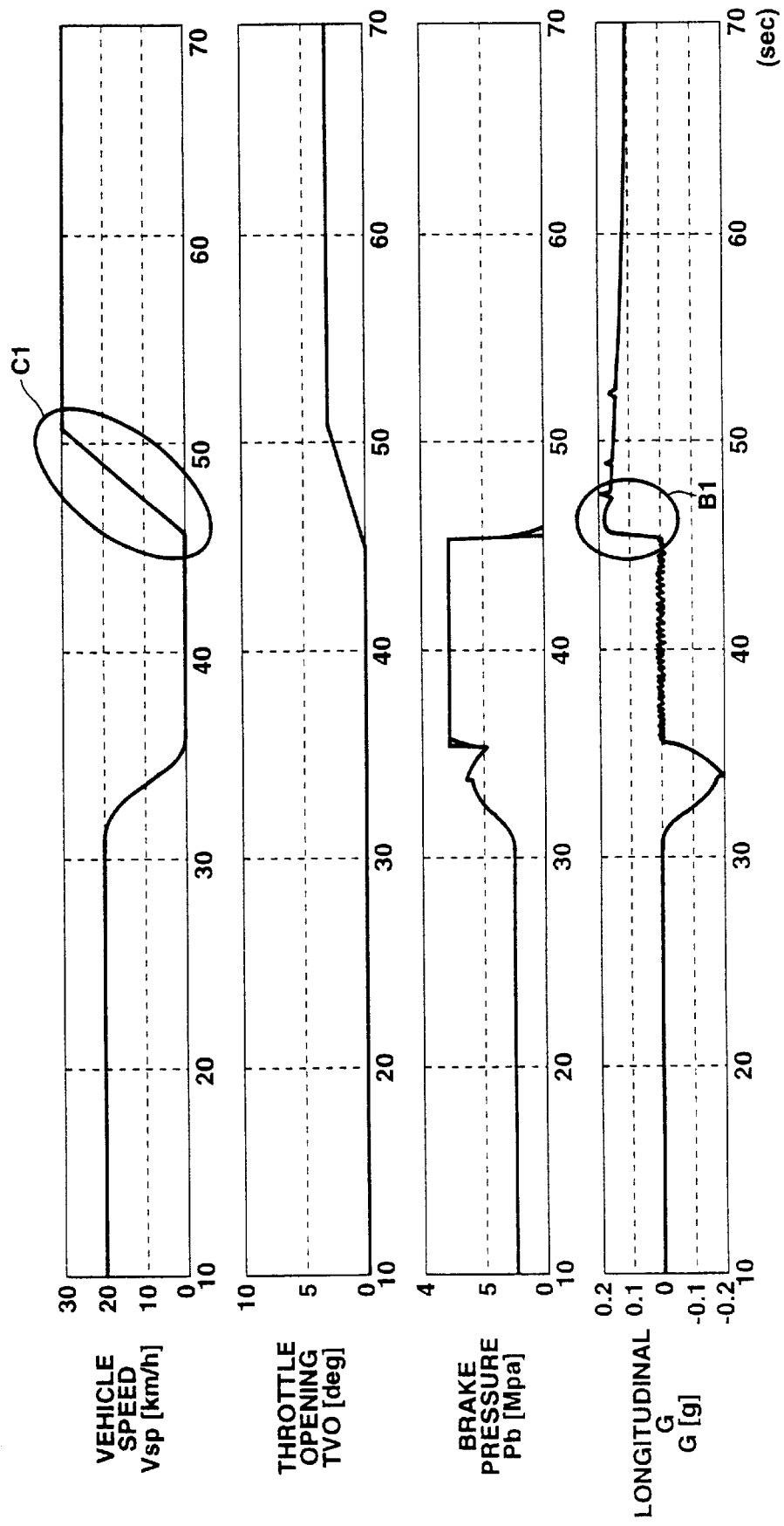
FIG. 15 is a graph showing the results of simulation of vehicle behavior in the comparable example when an accelerator override occurs in the stop condition by the automatic inching control on a downhill grade.
Figure 16:
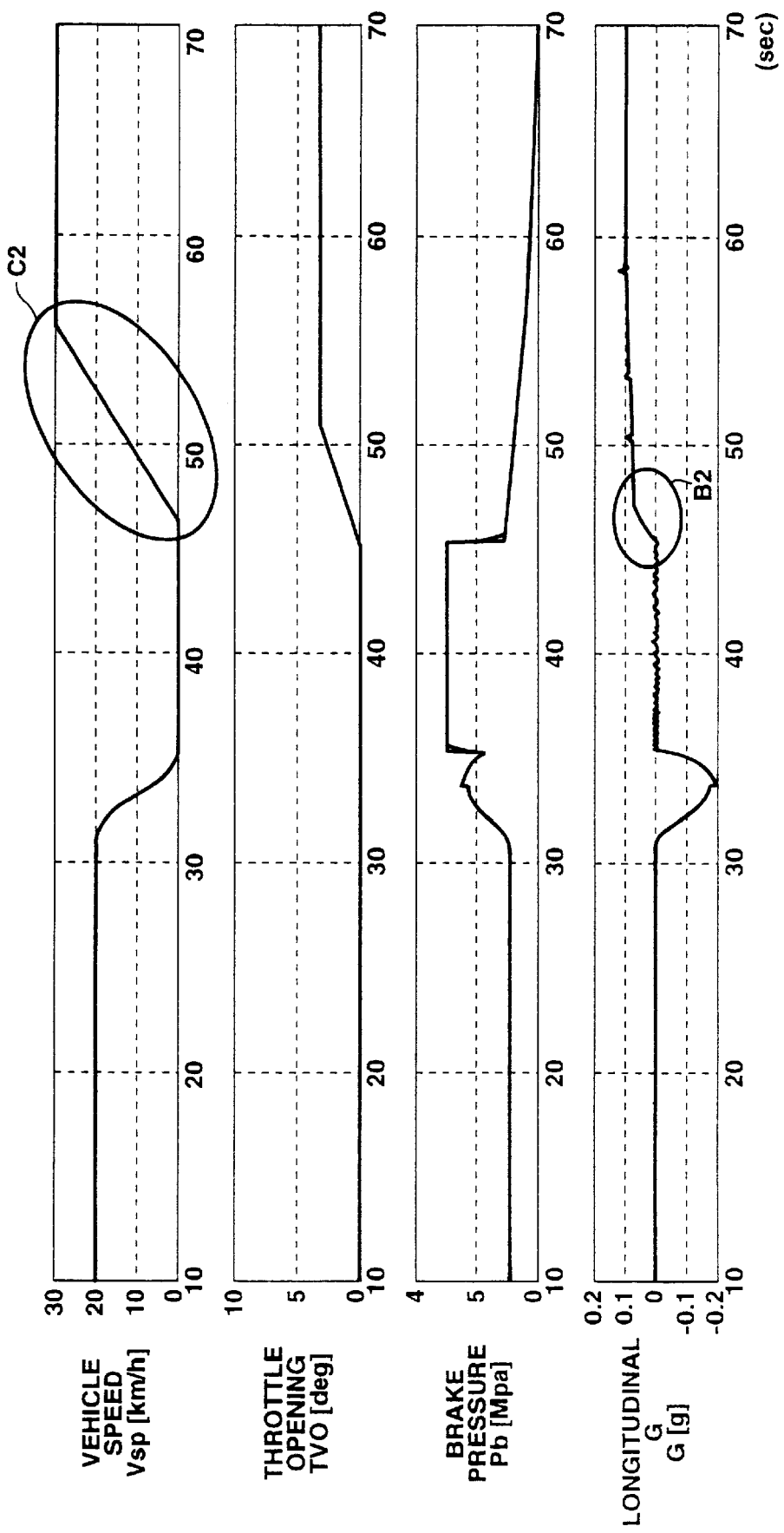
FIG. 16 is a graph showing the results of simulation of vehicle behavior in the example according to the embodiment of the present invention when an accelerator override occurs in the stop condition by the automatic inching control on a downhill grade.

FIGS. 15 and 16 show the results of simulation for vehicle behavior obtained when the accelerator pedal is depressed in the state in which the vehicle is stopped on a descending slope by the automatic inching control. FIG. 15 shows the results of a comparable example, and FIG. 16 shows the results of the control system according to this embodiment of the present invention. In the comparable example of FIG. 15, the brake for holding the vehicle at rest is released immediately when an accelerator override occurs at a point of 45 sec. Therefore, the longitudinal G (acceleration) rises sharply as shown at B1 in FIG. 15, and the vehicle speed increases sharply as shown at C1. In the example according to the present invention, by contrast, the braking force for canceling the downhill grade resistance is held unreleased. Therefore, the longitudinal G does not rise abruptly as shown at B2 in FIG. 16, and the vehicle does not start abruptly as shown in at C2.

In this way, the vehicle longitudinal force control system according to the embodiment can respond to an accelerator override from stoppage under the automatic inching control on an uphill or downhill slope, properly to prevent unwanted backward vehicle motion in the case of an uphill grade, and to prevent abrupt start in the case of an downhill grade. The driving ease and riding comfort are about the same as in the case of an accelerator override from stoppage on a level road.

The longitudinal force control system according to the embodiment increases the actual brake actuation force of the brake system to a first brake actuation force to hold the vehicle in the stop condition when the vehicle is brought to a stop by the automatic inching control. When a driver's accelerator pedal operation is detected during the automatic stop operation for holding the vehicle in the stop or rest condition with the first brake actuation force by the automatic inching control, the longitudinal force control system does not release the braking force of the automatic inching until the driving force due to the accelerator pedal operation becomes equal to or greater than the driving force corresponding to the grade resistance when the result of the grade resistance estimation indicates an uphill grade. When the result of the grade resistance estimation indicates a downhill grade, the longitudinal force control system decreases the brake actuation force of the vehicle from the first brake actuation force of the automatic inching to a brake actuation force value corresponding to the grade resistance, and thereafter further decreases the brake actuation force gradually. In this way, the longitudinal force control system according to the present invention allows the driver to start the vehicle smoothly irrespective of road conditions.

This application is based on a Japanese Patent Application No. 10(1998)-179207, filed on Jun. 25, 1998 in Japan for the same invention. The entire contents of the Japanese Patent Application No. 10(1998)-179207 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle longitudinal force control apparatus comprising:

a brake actuator which varies an actual brake actuating quantity to brake a vehicle;

an automatic control section which controls motion of the vehicle and stops the vehicle automatically by controlling the brake actuator;

a stop detecting section which detects an automatic stopping operation by the automatic control section to stop the vehicle;

a stop controlling section which causes the brake actuator to produce a first brake actuating quantity when the automatic stopping operation is detected by the stop detecting section;

an accelerator pedal operation detecting section which detects an accelerator pedal operation of the vehicle;

an accelerator input driving force calculating section which calculates an accelerator input driving force caused by an accelerator pedal operation;

a grade resistance estimating section which calculates an estimated grade resistance acting on the vehicle;

a second brake actuating quantity calculating section which calculates a second brake actuating quantity corresponding to the estimated grade resistance determined by the grade resistance estimating section; and a brake actuating force adjusting section which adjusts the first brake actuating quantity of the brake actuator in accordance with the estimated grade resistance, the accelerator input driving force and the second brake actuating quantity when the stop detecting section indicates existence of the automatic stopping operation of the vehicle and the accelerator pedal operation detecting section indicates existence of an accelerator pedal operation.

2. The vehicle longitudinal force control apparatus as claimed in claim 1 wherein, when the estimated grade resistance indicates an uphill grade, the brake actuating quantity adjusting section holds the brake actuator unreleased until the accelerator input driving force becomes greater than the estimated grade resistance.

3. The vehicle longitudinal force control apparatus as claimed in claim 1 wherein, when the estimated grade resistance indicates a downhill grade, the brake actuating quantity adjusting section changes the brake actuating quantity of the brake actuator stepwise from the first brake actuating quantity to the second brake actuating quantity and decreases the brake actuating quantity of the brake actuator gradually from the second brake actuating quantity.

4. The vehicle longitudinal force control apparatus as claimed in claim 3 wherein the second brake actuating quantity calculated by the second brake actuating quantity calculating section is a brake actuating quantity causing the brake actuator to produce a braking force equaling the estimated grade resistance calculated by the grade resistance estimating section.

5. The vehicle longitudinal force control apparatus as claimed in claim 3 wherein the brake actuating quantity adjusting section decreases the brake actuating quantity of the brake actuator from the second brake actuating quantity at a variable decreasing speed, and varies the decreasing speed in accordance with a speed of the accelerator pedal operation.

6. The vehicle longitudinal force control apparatus as claimed in claim 1 wherein the brake actuator produces the first brake actuating quantity when the automatic stopping operation is detected by the stop detecting section, and the first brake actuating quantity is greater than a brake actuating quantity at a time of detection of the automatic stopping operation.

7. The vehicle longitudinal force control apparatus as claimed in claim 1, wherein the brake actuator is an actuator to brake the vehicle without depressing a brake pedal of the vehicle.

8. The vehicle longitudinal force control apparatus as claimed in claim 1, wherein the automatic control section is a system to control a vehicle-to-vehicle headway distance from the vehicle to a forward vehicle.

9. An automotive vehicle comprising;
an actuator section varying an actual longitudinal force of the vehicle, the actuator section comprising a brake system which produces an actual braking force of; the vehicle, and a power system which produces an actual driving force of the vehicle:

a sensor section which collects input information on a vehicle operating condition of the vehicle; and a control section which is connected with the actuator section and the sensor section, to control motion of the vehicle, stop the vehicle and hold the vehicle in a stop condition by controlling the actual braking force and driving force with the brake system and power system in accordance with the input information, which allows a start of the vehicle from the stop condition in response to a driver's accelerator input by performing an automatic brake releasing operation to decrease the actual braking force from a stop holding braking force value for holding the vehicle in the stop condition to a minimum braking force value, and which estimates a grade resistance of the vehicle and modifies the automatic brake releasing operation in accordance with the arade resistance, wherein the control section produces a starting override signal when a driver's accelerator input is produced in the stop condition, and retards the automatic brake releasing operation with respect to generation of the starting override signal in a first modifying mode in a case of an uphill grade and in a second modifying mode different from the first modifying mode in a case of a downhill grade.

10. The vehicle as claimed in claim 9 wherein the control section determines a grade resistance parameter representing the grade resistance by estimating the grade resistance of the vehicle, further determines a driver's input driving force parameter representing a driving force produced by the driver's accelerator input in accordance with an amount of the driver's accelerator input, and modifies a brake releasing characteristic of the automatic brake releasing operation in accordance with the grade resistance parameter and the driver's input driving force parameter.

11. The vehicle as claimed in claim 10 wherein the control section discriminates an uphill grade and a downhill grade in accordance with the grade resistance parameter, and modifies the brake releasing characteristic of the automatic brake releasing operation in a first modifying mode in a case of the uphill grade and in a second modifying mode different from the first modifying mode in a case of the downhill grade.

12. The vehicle as claimed in claim 10 wherein the control section produces a uphill condition signal representing an uphill grade, and defers a start of the brake releasing operation until the driver's input driving force parameter becomes equal to or greater than the grade resistance parameter when the uphill condition signal is present.

13. The vehicle as claimed in claim 10 wherein the control section decreases the actual braking force from the stop holding braking force value to an intermediate braking force value sharply, and further decreases the actual braking force from the intermediate braking force value to the minimum braking force value gradually when a downhill condition signal representing a downhill grade is present, the intermediate braking force value being determined in accordance the grade resistance parameter.

14. A vehicle longitudinal force control apparatus comprising:
automatic control means for controlling motion of the vehicle and stopping the vehicle automatically;

stop detecting means for producing a stop condition signal in response to an automatic stopping operation by the automatic control means;

override detecting means for producing an accelerator override condition signal indicating a driver's accelerator override;

input driving force calculating means for calculating a driver's input driving force parameter representing a driver's input driving force produced by a driver's accelerator operation;

grade resistance estimating means for estimating a grade resistance of the vehicle and calculating a grade resisting parameter corresponding to the grade resistance; and brake releasing means for decreasing a braking force of the vehicle from a stop holding braking force value according to a brake release control characteristic in response to the accelerator override signal when the stop condition signal is present, and for adjusting the brake release control characteristic in accordance with the driver's input driving force parameter and the grade resisting parameter.

15. The vehicle longitudinal force control apparatus as claimed in claim 14 wherein the brake releasing means discriminates between an uphill grade and a downhill grade in accordance with the grade resisting parameter, the grade resistance estimating means determines the grade resisting parameter which comprises a grade resisting driving force parameter corresponding to the grade resistance, and a grade resisting braking force parameter corresponding to the grade resistance, and the brake releasing means adjusts the brake release control characteristic in accordance with the driver's input driving force parameter and the grade resisting driving force parameter in a case of the uphill grade, and in accordance with the grade resisting braking force parameter without regard to the driver's input driving force parameter in a case of the downhill grade.

16. A vehicle longitudinal force control method comprising:

producing a stop condition signal in response to an automatic stopping operation to stop a vehicle automatically;

producing an accelerator override condition signal indicating a driver's accelerator override;

calculating a driver's input driving force parameter representing a driver's input driving force produced by a driver's accelerator operation;

estimating a grade resistance of the vehicle and calculating a grade resisting parameter corresponding to the grade resistance; and decreasing a braking force of the vehicle from a stop holding braking force value according to a brake release control characteristic in response to the accelerator override signal when the stop condition signal is present, and adjusting the brake release control characteristic in accordance with the driver's input driving force parameter and the grade resisting parameter.

17. The vehicle longitudinal force control method as claimed in claim 16, wherein the grade resisting parameter is a quantity indicating the degree of inclination of a road and discriminating between an uphill grade and a downhill grade.

* * * * *